Patented Feb. 19, 1952

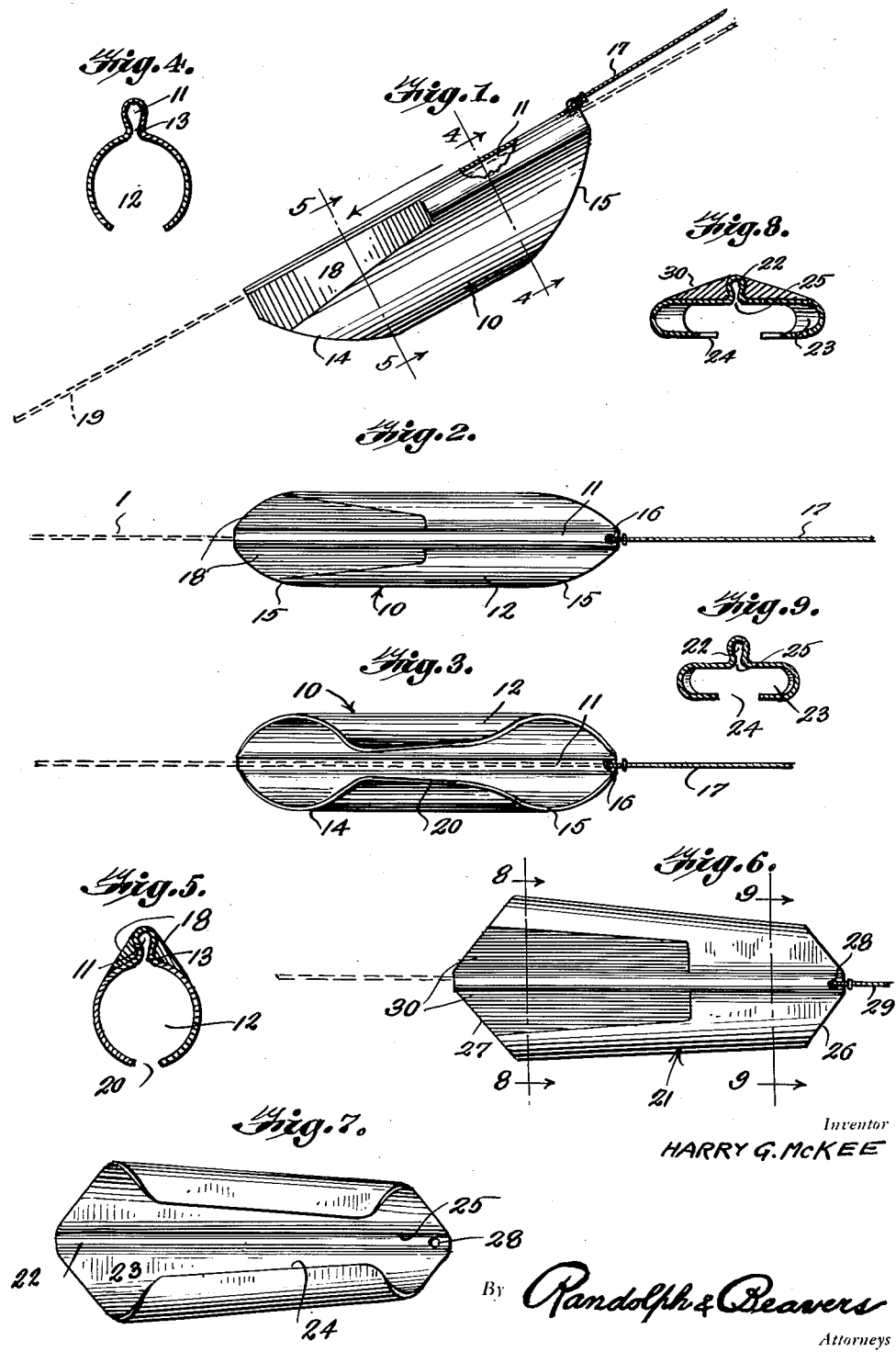

2,586,073

UNITED STATES PATENT OFFICE 2,586,073

FISH LURE RELEASER

Harry G. McKee, Syracuse, N. Y., assignor of ten per cent to Nicholas C. Schneider, Syracuse, N. Y.

Application September 26, 1947, Serial No. 776,260

6 Claims. (Cl. 43—17.2)

This invention relates to a fisherman's appliance adapted for use in releasing snagged fish plugs or spoons and has for a primary object to provide a releaser or extremely simple structure capable of being detachably applied to a fishing line for movement downwardly therealong for dislodging the snagged hook of a plug or spoon and which is provided with a body portion capable of receiving therein the plug or spoon.

Still a further object of the invention is to provide a releaser of the aforedescribed character capable of being economically manufactured and sold, which is efficient and durable in use and which may be quickly and easily applied to or detached from a fishing line and will effectively maintain itself in an applied position.

Still another object of the invention is to provide a releaser which is weighted causing it to more readily slide down a fishing line and strike a plug or spoon with sufficient impact to dislodge the hook thereof from an obstruction and which weighted portion also functions to maintain the releaser in an applied position on the fish line.

Still another object of the invention is to provide a releaser which can equally well be utilized for dislodging snagged fish hooks.

Other objects and advantages of the invention will hereinafter become more fully apparent in the following description of the drawing, illustrating preferred embodiments thereof, and wherein:

Figure 1 is a side elevational view, partly in section showing one embodiment of the releaser in an applied position;

Figure 2 is a top plan view thereof;

Figure 3 is a bottom plan view of the same;

Figures 4 and 5 are cross sectional views thereof taken substantially along planes as indicated by the lines 4—4 and 5—5, respectively, of Figure 1;

Figure 6 is a top plan view of another embodiment of the invention;

Figure 7 is a bottom plan view thereof, and

Figures 8 and 9 are cross sectional views of the same taken substantially along planes as indicated by the lines 8—8 and 9—9, respectively, of Figure 6.

Referring more particularly to the drawings, first with reference to the form of the invention illustrated in Figures 1 to 5, the releaser thereof, designated generally 10 is especially adapted for use in dislodging snagged fish plugs and comprises an elongated body preferably formed of sheet metal and which is bent longitudinally to provide a sleeve like portion 11 which extends from end to end thereof and an enlarged slit barrel like portion 12 which is disposed substantially parallel to the sleeve like portion 11 and which is in communication therewith throughout the length of the portions 11 and 12 by a restricted communicating slot 13. The barrel portion 12 is provided with beveled or tapered ends 14 and 15 formed by rounded edges of the metal piece from which the releaser 10 is constructed. The sleeve like portion 11 is provided with an opening 16 adjacent to the upper end of the releaser 10 by means of which one end of a retrieving line 17 is attached to the releaser 10. The releaser 10 also includes a pair of weights 18 which are correspondingly affixed to the outer side of the opposite end thereof between the portions 11 and 12 and with the preponderance of the weight of the elements 18 disposed below the sleeve like portion 11. The weighted elements 18 extend longitudinally of the releaser 10 and are adapted to provide sufficient weight to cause said releaser to slide rapidly down a fishing line, indicated in broken lines at 19 for striking a plug, not shown, attached to the lower end of the line 19 and having hook snagged on an obstruction. It will be readily obvious that the weighted elements 18 will cause the releaser 10 to strike with sufficient impact for ordinarily dislodging the snagged hook of a plug and the tapered end 14 of the barrel like portion 12 and which constitutes the leading end of the releaser 10 is adapted to pass over the body of the plug under certain conditions, so that the releaser can exert its impact directly on the snagged hook for disengaging it from its obstruction. The weighted elements 18 by being disposed below the sleeve like portion 11, which slidably engages the fishing line 19, will maintain the releaser thereon and in the position illustrated in Figure 1. The slotted passage 13 and the slotted longitudinal opening 20 in the bottom of the barrel portion 12 will enable the releaser 10 to be quickly and easily applied to or removed from the fishing line 19. The retrieving line 17 is utilized to retrieve the releaser 10 along the line 19 after it has dislodged a plug or for the purpose of permitting it to slide downwardly along the fishing line 19 in another effort to dislodge a badly snagged plug.

Figures 6 to 9 illustrate a releaser particularly adapted for use for releasing the hook of a spoon.

The releaser of Figures 6 to 9, designated generally 21, is likewise formed from a body composed of a single sheet of metal or the like having a longitudinal extending intermediate portion shaped to provide a sleeve 22, corresponding to the sleeve 11 and for slidably engaging the fishing line 19. The side edge portions of the body are shaped to provide a substantially flat spoon receiving portion 23 which is formed by shaping the corresponding side edge portions of the releaser body to extend outwardly in opposite directions laterally from the sleeve portion 22 and the longitudinal edges of which are turned downwardly and inwardly but terminate in spaced relationship to one another to provide a relatively wide slot 24 therebetween. The wide spoon receiving portion 23 has substantially parallel top and bottom wall portions, each of which is wider than the smaller sleeve portion. The releaser 21 also includes a restricted slot 25 forming a communicating passage between the sleeve 22 and spoon receiving portion 23 and it will be readily obvious that the fishing line 19 can be passed through the slot 24 and passage 25 for engaging the fishing line in the sleeve 22 for mounting the releaser 21 thereon or for disengaging the releaser therefrom. The body of the releaser 21 is provided with tapered upper and lower ends 26 and 27, respectively, and is tapered from its lower end 27 toward its upper end 26. The sleeve 22 is provided with an opening 28, adjacent the upper end thereof for attachment of a retrieving line 29 thereto. Elongated weighted elements 30 are secured longitudinally to the upper side of the portion 23 and along the sleeve 22, adjacent the lower end of 27 thereof and which function for the same purposes as the weighted elements 18.

It will be readily apparent that the spoon releaser 21 may be utilized in the same manner as the plug releaser 10, as previously described, and the portion 23 thereof is adapted to pass over the spoon so that the impact of the releaser can be exerted directly on the snagged hook.

Obviously, the releasers 10 and 21 can also be utilized for disengaging a snagged fish hook.

Various modifications and changes in the embodiment of the invention as disclosed are contemplated and may obviously be resorted to, without departing from the spirit or scope of the invention as hereinafter defined by the appended claims.

I claim as my invention:

1. A fish lure releaser comprising an elongated body having substantially parallel sleeve portions of different sizes extending longitudinally thereof, said sleeve portions being open longitudinally throughout their length to provide an entrance slot for a fishing line to the larger sleeve portion and an entrance slot between the sleeve portions for positioning the fishing line loosely in the smaller sleeve portion for slidably mounting the releaser thereon, and weighted elements fixed to the releaser body and disposed below the level of the fishing line when the releaser is slidably mounted on said fishing line.

2. A fish lure releaser comprising an elongated body having substantially parallel sleeve portions of different sizes extending longitudinally thereof, said sleeve portions being open longitudinally throughout their length to provide an entrance slot for a fishing line to the larger sleeve portion and an entrance slot between the sleeve portions for positioning the fishing line loosely in the smaller sleeve portion for slidably mounting the releaser thereon, and weighted elements fixed to the releaser body and disposed below the level of the fishing line when the releaser is slidably mounted on said fishing line, said weighted elements comprising a pair of corresponding elongated members disposed longitudinally of the releaser body and extending to adjacent the lower, leading end thereof.

3. A fish lure releaser comprising an elongated body having substantially parallel sleeve portions of different sizes extending longitudinally thereof, said sleeve portions being open longitudinally throughout their length to provide an entrance slot for a fishing line to the larger sleeve portion and an entrance slot between the sleeve portions for positioning the fishing line loosely in the smaller sleeve portion for slidably mounting the releaser thereon, said larger sleeve portion forming a lure receiving portion and being disposed below the smaller sleeve portion when the releaser is slidably mounted on the fishing line for receiving a fish plug body attached to the lower end of the fishing line, and the lower, leading end of said lure receiving portion being beveled on its under side.

4. A fish lure releaser comprising an elongated body having substantially parallel sleeve portions of different sizes extending longitudinally thereof, said sleeve portions being open longitudinally throughout their length to provide an entrance slot for a fishing line to the larger sleeve portion and an entrance slot between the sleeve portions for positioning the fishing line loosely in the smaller sleeve portion for slidably mounting the releaser thereon, said larger sleeve portion forming a lure receiving portion and being disposed below said smaller sleeve portion when the releaser is slidably mounted on the fishing line, said larger sleeve portion having substantially parallel top and bottom wall portions extending transversely in opposite directions from the smaller sleeve portion and each of which is wider than the smaller sleeve portion.

5. A fish lure releaser comprising an elongated body having substantially parallel sleeve portions of different sizes extending longitudinally thereof, said sleeve portions being open longitudinally throughout their length to provide an entrance slot for a fishing line to the larger sleeve portion and an entrance slot between the sleeve portions for positioning the fishing line loosely in the smaller sleeve portion for slidably mounting the releaser thereon, said larger sleeve portion forming a lure receiving portion and being disposed below said smaller sleeve portion when the releaser is slidably mounted on the fishing line, said larger sleeve portion being relatively wide in cross section for engaging over the body of a spoon, and a weighted portion secured to said lure receiving portion and being disposed to maintain the releaser body in slidable engagement with the fishing line.

6. A fish lure releaser comprising an elongated body having an upper slotted sleeve portion for slidable engagement with a fishing line and a lower slotted sleeve portion for engagement over a lure body attached to the line, said slotted portions affording entrance and exit openings for engaging a fishing line with or disengaging it from said upper sleeve portion, said upper sleeve portion being substantially smaller in cross section than the lower slotted portion, said releaser body having a leading end, and weighting means secured to the leading end of said releaser body below the upper part of the upper slotted sleeve portion for increasing the impact of the fish lure releaser with a snagged lure and for maintaining the releaser body in slidable engagement with the fishing line.

HARRY G. McKEE.

REFERENCES CITED

The following references are of record in the file of this patent:

UNITED STATES PATENTS

| Number | Name | Date |
|---|---|---|
| 475,257 | Thuge | May 17, 1892 |
| 622,610 | Dudley | Apr. 4, 1899 |
| 972,531 | Haynes | Oct. 11, 1910 |
| 1,611,544 | Maurus | Dec. 21, 1926 |
| 2,058,416 | Comstock | Oct. 27, 1936 |
| 2,453,245 | McDonald | Nov. 9, 1948 |